United States Patent
Nie et al.

(10) Patent No.: US 12,074,926 B2
(45) Date of Patent: Aug. 27, 2024

(54) INFORMATION SWITCHING AND SHARING METHOD, DEVICE, ELECTRONIC APPARATUS, AND STORAGE MEDIUM

(71) Applicant: BEIJING BYTEDANCE NETWORK TECHNOLOGY CO., LTD., Beijing (CN)

(72) Inventors: Xiaotao Nie, Beijing (CN); Qianyi Xu, Beijing (CN); Guanghan Zhang, Beijing (CN); Jingyi Zhang, Beijing (CN); Zhihui Ha, Beijing (CN); Zhongyang Guo, Beijing (CN); Tao Chen, Beijing (CN); Yutao Wu, Beijing (CN); Qi Zhang, Beijing (CN); Mingzhe Ruan, Beijing (CN); Junmin Song, Beijing (CN); Minming Zhou, Beijing (CN); Yin Shi, Beijing (CN); Bin Zhu, Beijing (CN); Shuhan Lu, Beijing (CN); Xi Hu, Beijing (CN)

(73) Assignee: BEIJING BYTEDANCE NETWORK TECHNOLOGY CO., LTD. (CN)

(*) Notice: Subject to any disclaimer, the term of this patent is extended or adjusted under 35 U.S.C. 154(b) by 0 days.

(21) Appl. No.: 18/359,662

(22) Filed: Jul. 26, 2023

(65) Prior Publication Data
US 2023/0379373 A1   Nov. 23, 2023

Related U.S. Application Data

(63) Continuation of application No. 17/931,095, filed on Sep. 9, 2022, now Pat. No. 11,757,955, which is a (Continued)

(30) Foreign Application Priority Data

Apr. 30, 2020 (CN) .......................... 202010365457.8

(51) Int. Cl.
H04L 65/402 (2022.01)
H04L 51/04 (2022.01)
(Continued)

(52) U.S. Cl.
CPC ............ *H04L 65/402* (2022.05); *H04L 51/04* (2013.01); *H04L 65/403* (2013.01);
(Continued)

(58) Field of Classification Search
None
See application file for complete search history.

(56) References Cited

U.S. PATENT DOCUMENTS 8,112,480 B2 * 2/2012 Anantharaman ..... H04L 65/403
709/227
9,253,129 B2 * 2/2016 Bassemir ............. H04L 51/046
(Continued)

FOREIGN PATENT DOCUMENTS

CN   102420782 A   4/2012
CN   103955501 A   7/2014
(Continued)

OTHER PUBLICATIONS

Ota et al, "Web page sharing apparatus and web page sharing method", JP 2012-155672, Aug. 16, 2012, IP.com (Year: 2012).*
(Continued)

*Primary Examiner* — Lashonda Jacobs-Burton

(57) ABSTRACT

An information switching and sharing method, a device, an electronic apparatus, and a storage medium are provided. The method is applied to a client of a sharee, and the method includes: receiving a first page shared by a client of a sharer, in a free browsing mode, wherein the shared first page comprises a link to a second page, and the free browsing mode is a mode in which a page is freely browsed by the client of the sharee; and jumping to the second page in
(Continued)

S110 — A second page is jumped to, in response to a detection of a trigger operation on a link to the second page in a currently shared first page S120 — In the case that the client of the sharee is in a follow mode, the second page is shared with the client of the sharee, to display the second page on the client of the sharee in the follow mode by following a display of the client of the sharer response to a detection of a trigger operation on the link in the shared first page.

18 Claims, 3 Drawing Sheets

Related U.S. Application Data continuation of application No. PCT/CN2021/086511, filed on Apr. 12, 2021.

(51) Int. Cl.
*H04L 65/403* (2022.01)
*H04L 12/18* (2006.01)
*H04L 67/02* (2022.01)

(52) U.S. Cl.
CPC ...... *H04L 12/1813* (2013.01); *H04L 12/1822* (2013.01); *H04L 67/02* (2013.01)

(56) References Cited

U.S. PATENT DOCUMENTS

| | | | | |
|---|---|---|---|---|
| 9,679,076 | B2* | 6/2017 | Du | G06F 40/14 |
| 10,437,548 | B2* | 10/2019 | Hu | H04L 67/141 |
| 10,447,742 | B2* | 10/2019 | Qiu | H04L 67/561 |
| 11,399,090 | B2* | 7/2022 | Gao | G06Q 30/06 |
| 2005/0021624 | A1* | 1/2005 | Herf | H04L 12/1822 709/204 |
| 2006/0004775 | A1 | 1/2006 | Kobayashi et al. | |
| 2009/0125522 | A1* | 5/2009 | Kodama | G06F 21/6254 707/999.009 |
| 2010/0131868 | A1* | 5/2010 | Chawla | G06F 3/0481 715/759 |
| 2014/0006915 | A1* | 1/2014 | Bank | G06F 16/954 715/205 |
| 2014/0123033 | A1* | 5/2014 | Uhma | G06F 16/972 715/753 |
| 2014/0214919 | A1 | 7/2014 | Taylor et al. | |
| 2015/0006671 | A1* | 1/2015 | Feng | H04W 4/023 709/217 |
| 2015/0058407 | A1 | 2/2015 | Uhma et al. | |
| 2015/0269270 | A1* | 9/2015 | Du | G06F 16/986 715/205 |
| 2016/0330268 | A1* | 11/2016 | Feng | H04L 65/4015 |
| 2016/0338114 | A1* | 11/2016 | Shimizu | H04W 74/0841 |
| 2017/0118258 | A1* | 4/2017 | Lieb | G06F 9/452 |
| 2017/0339248 | A1* | 11/2017 | Karalis | H04L 63/1433 |
| 2018/0089632 | A1* | 3/2018 | Singh | G06Q 10/1093 |
| 2018/0343261 | A1* | 11/2018 | Lopez-Uricoechea | H04L 63/126 |
| 2019/0370113 | A1* | 12/2019 | Zhao | G06F 9/545 |
| 2020/0076862 | A1* | 3/2020 | Eliason | G06F 3/04897 |
| 2021/0081363 | A1* | 3/2021 | Anand | G06F 16/986 |
| 2021/0168234 | A1* | 6/2021 | Gao | G06Q 30/0641 |
| 2021/0182430 | A1* | 6/2021 | Negi | G06F 21/6263 |
| 2021/0224091 | A1* | 7/2021 | Hayatnagarkar | G06F 16/955 |

FOREIGN PATENT DOCUMENTS

| | | |
|---|---|---|
| CN | 104516883 A | 4/2015 |
| CN | 104660478 A | 5/2015 |
| CN | 104753973 A | 7/2015 |
| CN | 109302493 A | 2/2019 |
| JP | 2000215173 A | 8/2000 |
| JP | 2004070517 A | 3/2004 |
| JP | 2012155672 A | 8/2012 |
| WO | 2018188373 A1 | 10/2018 |
| WO | 2020256766 | 12/2020 |
| WO | WO-2020256766 A1 * 12/2020 ............ G11B 27/10 |

OTHER PUBLICATIONS

International Search Report issued Jul. 8, 2021 in International Patent Application No. PCT/CN2021/086511 (11 pages).
EP Search Report mailed Feb. 24, 2023 in EP Application No. 21796026.9 (6 pages).
Notice of Reasons for Refusal mailed Dec. 12, 2023 in JP Appl. No. 2022-563398, English translation (6 pages).

* cited by examiner

INFORMATION SWITCHING AND SHARING METHOD, DEVICE, ELECTRONIC APPARATUS, AND STORAGE MEDIUM

The present disclosure is a continuation of U.S. patent application Ser. No. 17/931,095, filed on Sep. 9, 2022, which is a continuation of International Application No. PCT/CN2021/086511, filed on Apr. 12, 2021. The International Application claims priority to Chinese Patent Application No. 202010365457.8, titled "INFORMATION SWITCHING AND SHARING METHOD, DEVICE, ELECTRONIC APPARATUS, AND STORAGE MEDIUM", filed on Apr. 30, 2020 with the China National Intellectual Property Administration. All of the afore-mentioned patent applications are hereby incorporated by reference in their entireties.

TECHNICAL FIELD

Embodiments of the present disclosure relate to the computer field, and in particular, to a method and an apparatus for switching and sharing information, an electronic device, and a storage medium.

BACKGROUND

With the continuous development of the Internet and communication technology, exchanging information through communication applications has become one of the important ways for users to exchange information. Currently, when the information pages are switched each other and shared through the communication applications, the sharer is required to trigger the operation of "exiting from the currently shared page-sharing the next page" on the client. When the two pages are switched and shared for multiple times or a large number of pages are switched and shared, the sharer is required to repeatedly trigger the operation of "exiting from the shared page-sharing the page" on the client, which consumes a lot of time and cost, thereby affecting information sharing efficiency and reducing the experience for information sharing between the sharer and the other users.

SUMMARY OF THE INVENTION

A method and apparatus for switching and sharing information, an electronic device, and a storage medium are provided according to the embodiments of the present disclosure, to realize easy switching between the shared information pages, and thus improve the efficiency of information sharing and the shared experience between users.

In a first aspect, a method for switching and sharing information is provided according to an embodiment of the present disclosure. The method is applied to a client of a sharer. The method includes:
jumping to a second page, in response to a detection of a trigger operation on a link to the second page in a currently shared first page, where the currently shared first page is a page currently displayed, which is sent to a client of a sharee to be displayed on the client of the sharee; and
sharing the second page with the client of the sharee, in a case that the client of the sharee is in a follow mode, to display the second page on the client of the sharee in the follow mode by following a display of the client of the sharer, where the follow mode is a mode in which the client of the sharee follows the client of the sharer to display a page which is currently displayed on the client of the sharer.

In a second aspect, a method for switching and sharing information is further provided according to an embodiment of the present disclosure. The method is applied to a client of a sharee. The method includes:
receiving a second page shared by a client of a sharer, in a follow mode, where the follow mode is a mode in which a client of a sharee follows the client of the sharer to display a page which is currently displayed on the client of the sharer; and
displaying the second page in replacement of a currently displayed first page by following a display of the client of the sharer, where the second page is shared in a case that the client of the sharer detects a trigger operation on a link to the second page in the currently shared first page, and where the currently shared first page is a page currently displayed on the client of the sharer, which is sent to the client of the sharee to be displayed on the client of the sharee.

In a third aspect, an apparatus for switching and sharing information is provided according to an embodiment of the present disclosure. The apparatus is applied to a client of a sharer. The apparatus includes: a jumping module and a sharing module.

The jumping module is configured to jump to a second page in response to a detection of a trigger operation on a link to the second page in a currently shared first page, where the currently shared first page is a page currently displayed, which is sent to a client of a sharee to be displayed on the client of the share.

The sharing module is configured to share the second page with the client of the sharee, in a case that the client of the sharee is in a follow mode, to display the second page on the client of the sharee in the follow mode by following a display of the client of the sharer, where the follow mode is a mode in which the client of the sharee follows the client of the sharer to display a page which is currently displayed on the client of the sharer.

In a fourth aspect, an apparatus for switching and sharing information is provided according to an embodiment of the present disclosure. The apparatus is applied to a client of a sharee. The apparatus includes: a receiving module and a following module.

The receiving module is configured to receive a second page shared by a client of a sharer, in a follow mode, where the follow mode is the mode in which the client of the sharee follows the client of the sharer to display a page which is currently displayed on the client of the sharer.

The following module is configured to display the second page in replacement of a currently displayed first page by following a display of the client of the sharer, where the second page is shared in a case that the client of the sharer detects a trigger operation on a link to the second page in the currently displayed first page, and where the currently displayed first page is a page currently displayed on the client of the sharer, which is sent to a client of a sharee to be displayed on the client of the sharee.

In a fifth aspect, an electronic device is further provided in an embodiment of the present disclosure. The electronic device includes: one or more processors; a storage apparatus for storing one or more programs. The one or more programs, when executed by the one or more processors, cause the one or more processors to implement the method for switching and sharing the information according to any one of the embodiments of the present disclosure.

In a sixth aspect, a storage medium containing computer-executable instructions is further provided in an embodiment of the present disclosure. The computer-executable instructions, when executed by a computer processor, implement the method for switching and sharing the information according to any one of the embodiments of the present disclosure.

According to the technical solution of the embodiments of the present disclosure, the client of the sharer currently displays the first page; and sends the first page to the client of the sharee to display the first page on the client of the sharee simultaneously. The client of the sharer is jumped to the second page, in response to the click on the link to the second page in the first page on the client of the sharer; and sends the second page to the client of the sharee, in the case that the client of the sharee is in the follow mode, to display the second page on the client of the sharee in the follow mode by following the display of the client of the sharer.

In addition, with the common screen sharing technology, the first page of the client of the sharee can be jumped to the second page following the client of the sharer. However, network delay and video decompression distortion and other problems occur in the video streaming process, due to the high requirement on the network and video compression. As a result, the shared image becomes unsmooth and unclear, which seriously affects the information sharing effect and user experience for attending a conference. According to the method for switching and sharing the information disclosed in the embodiments of the present disclosure, the high-fidelity and smooth information sharing is realized by sharing the page content of the information page, or together with the user operation. In addition, the second page is jumped to and shared through the trigger on the link to the second page in the currently shared first page on the client of the sharer, to facilitate the easy switching between the shared information pages, and improve information sharing efficiency and the shared experience between users.

BRIEF DESCRIPTION OF THE DRAWINGS

In conjunction with the drawings and with reference to the following embodiments, the above and other features, advantages and aspects of the embodiments of the present disclosure are more apparent. The same or similar reference numerals throughout the drawings represent the same or similar elements. It should be understood that the drawings are schematic and the components and elements are unnecessarily drawn to scale.

DETAILED DESCRIPTION OF THE EMBODIMENTS

Figure 1:
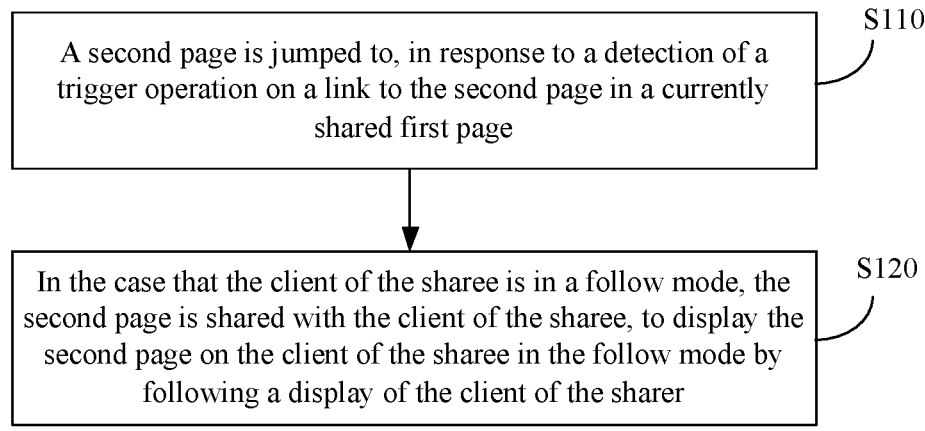
FIG. 1 is a schematic flowchart of a method for switching and sharing information according to a first embodiment of the present disclosure.

The embodiments of the present disclosure are described in detail below with reference to the drawings. Although some embodiments of the present disclosure are shown in the drawings, it should be understood that the present disclosure may be implemented in various forms and should not be construed as being limited to the embodiments described herein. The embodiments are provided for thoroughly and completely understanding the present disclosure. It should be understood that the drawings and the embodiments of the present disclosure are only illustrative of the disclosure, and are not intended to limit the protection scope of the present disclosure.

It should be understood that the steps in the method embodiment of the present disclosure may be performed in different orders and/or in parallel. In addition, the method embodiment may include an additional step and/or an omitted step that is not shown herein. The scope of the present disclosure is not limited in this aspect.

The term "include" and its variations in the present disclosure means open-ended inclusion, that is, "including but not limited to". The term "based on" means "based at least in part on". The term "one embodiment" means "at least one embodiment". The term "another embodiment" means "at least one additional embodiment". The term "some embodiments" means "at least some embodiments". The definitions of other terms are provided in the following descriptions.

It should be noted that the concepts such as "first" and "second" mentioned in the present disclosure are used to distinguish different apparatuses, modules or units, and are not used to limit an sequential order or interdependence of the functions performed by the apparatuses, modules or units.

It should be noted that the modifications such as "one" and "multiple" mentioned in the present disclosure are illustrative and not restrictive. Those skilled in the art should understand that the modifications should be understood as "one or more" unless otherwise expressly indicated in the context.

First Embodiment

FIG. 1 is a schematic flowchart of a method for switching and sharing information according to a first embodiment of the present disclosure. The present embodiment of the present disclosure is particularly suitable for switching and sharing two information pages therebetween for multiple times on a client, or switching and sharing a large number of information pages on the client. The method may be implemented by means of an apparatus for switching and sharing information, which may be implemented in the form of software and/or hardware. The apparatus may be configured in an electronic device, such as a smart phone, a tablet computer, a notebook computer or a desktop computer.

As shown in FIG. 1, the method for switching and sharing information according to the present embodiment is applied to a client of a sharer. The method includes the following S110 to S120.

In S110, a second page is jumped to, in response to a detection of a trigger operation on a link to the second page in a currently shared first page.

Common information sharing technology is a kind of screen sharing technology, in which a video stream on the screen interface of the client of the sharer is captured, and is transmitted to a client of a sharee through the network bandwidth. With the information sharing method involved in the embodiment of the present disclosure, the client of the sharer sends to the client of the sharee a page content of the currently displayed information page (for example, a Jackins document page, a word document page, an Excel document page, or a PowerPoint (PPT) document page) or together with operations such as scrolling up and down the information page or editing a content of the information page. Specifically, the information sharing method involved in the embodiment of the present disclosure is a kind of page sharing technology. In the page sharing technology, the client of the sharer shares an access address for the shared page or the access address for a file displayed in the shared page with the client of the sharee in a sharing range, and shared the operation information on the page or file corresponding to the access address with the client of the sharee in the sharing range. In this way, the client of the sharee may access and display the page or file corresponding to the received access address according to the received access address, so that the operation on the client of the sharee is consistent with the operation on the client of the sharer based on the received operation information, In this way, the synchronous display of pages on the client of the sharee and the client of the sharer are realized.

However, in the information sharing method related to an embodiment, when the information pages are switched and shared, the client of the sharer is required to trigger the operation of "exiting from the currently shared page-sharing the next page". When two pages are switched and shared for multiple times or a large number of pages are switched and shared, the client of the sharer is required to repeatedly trigger the operation of "exiting from the shared page-sharing the page", which consumes a lot of time and cost, thereby affecting information sharing efficiency and reducing the experience for information sharing between the sharer and the other users. Therefore, the defect in the information sharing method related to the present embodiment can be overcome with the method for switching and sharing information according to embodiments of the present disclosure.

In an embodiment of the present disclosure, when a client sends information to the other client to share the information with the other client, the client may be considered as the client of the sharer. When this client receives the information shared from the other client, this client is also considered as the client of the sharee. That is, the same client may be used as the client of the sharer or the client of the sharee. The client of the sharer sharing a page to the client of the sharee may be considered as a process of sending the page content of the currently displayed page or the page contect together with the user operation (such as scrolling the page up and down, and editing the page content) from the client of the sharer to the client of the sharee, such that the client of the sharee may display the page content simultaneously or performs the received user operation in parallel. Therefore, the currently shared first page in the present embodiment is the page currently displayed on the client of the sharer, which is sent to the client of the sharee to be displayed on the client of the sharee.

A hierarchical page may be formed by embedding a link to another page in a page. The hierarchical page may be used as an upper-level page for anther page, the link of which is embedded in the hierarchical page; and another page is used as a lower-level page for the hierarchical page. For example, a link to a page 2 is embedded in a page 1. The page 1 is jumped to the page 2 in response to a click on the link to the page 2 embedded in the page 1. That is to say, the page 1 is an upper-level page of the page 2, and the page 2 is a lower-level page of the page 1. The first page in the present embodiment may be any level of page that is linkable to the next level of page among the hierarchical pages shared by the client of the sharer with the client of the sharee. A second page may be any one of the lower-level pages which may be linked to the first page.

For example, the hierarchical page shared by the client of the sharer with the client of the sharee has a hierarchical structure as follow. Page 1 is a home page with a link to page 2 and a link to page 3 embedded therein, a link to page 4 is embedded into page 2, a link to page 1 is embedded into page 4. In this case, the first page that is currently shared by the client of the sharer may be page 1, page 2, or page 4. Moreover, when the first page is page 1, the second page may be determined to be page 2 or page 3, based on the trigger operation received by the client of the sharer. When the first page is page 2, the second page is page 4. When the first page is page 4, the second page is page 1.

When the client of the sharer shares the first page with the client of the sharee, the second page is jumped to directly in response to a detection of a trigger operation (such as a single-click or double-click operation) on the link to the second page in the first page. Therefore, in the case that two pages are switched and shared for multiple times by the client of the sharer or a large number of pages are switched and shared, the tedious operation of repeatedly exiting from the currently shared first page and re-sharing the second page is avoided, thereby facilitating the page switching.

In S120, in the case that the client of the sharee is in a follow mode, the second page is shared with the client of the sharee, to display the second page on the client of the sharee in the follow mode by following a display of the client of the sharer.

In the embodiment of the present disclosure, the follow mode is a mode in which the client of the sharee follows the client of the sharer to display a page which is currently displayed on the client of the sharer. In the follow mode, the client of the sharee receives operation information of the currently demonstrating client on the page, and renders the page based on the operation information. In this way, a display mode following the currently demonstrating client is realized. The display page on the client of the sharee in the follow mode is the same as that on the currently demonstrating client. The currently demonstrating client is a client which sends information to other clients in the sharing range to share the information with the other clients.

The client of the sharee may be in the follow mode under the following circumstances. First, in the case that the first page shared by the client of the sharer with the client of the sharee is a home page of the hierarchical page, the client of the sharee may display the home page through a click on a shared link sent by the client of the sharer. In this case, the client of the sharee is set to the follow mode by default, or is also set to the follow mode according to the trigger operation from the user. Second, in the case that the first page shared by the client of the sharer with the client of the sharee is an intermediate-level page, when the client of the sharee displays an upper-level page of the first page in the follow mode, the client of the sharee is also in the follow mode by default when displaying the first page. Third, in the case that the hierarchical page shared by the client of the sharer is freely browsed on the client of the sharee, the client of the sharee may be switched to be in the follow mode according to the trigger operation of the user. In this case, when the client of the sharer currently shares the first page, the client of the sharee may display the first page in a follow-up manner.

When the currently shared first page on the client of the sharer is jumped to the second page, the second page is shared to the client of the sharee in the follow mode while being displayed on the client of the sharer. That is, when the client of the sharee is not in the follow mode, the second page is not sent to the client of the sharee. By sharing the second page with the client of the sharee in the follow mode, the client of the sharee in the follow mode may display the second page instead of the first page. Therefore, in the case that two pages are switched and shared for multiple times by the client of the sharer or a large number of pages are switched and shared by the client of the sharer, the tedious operation of the client of the sharee repeatedly exiting from the currently shared first page and re-sharing the second page is avoided, thereby facilitating the page switching.

In an embodiment, after the second page is shared with the client of the sharee in the follow mode, the method further includes: rolling back to the first page in response to a detection of the trigger operation on a rollback control; sharing the first page with the client of the sharee in the follow mode, to display the first page on the client of the sharee in the follow mode by following a display of the client of the sharer.

In an embodiment, the rollback control may be provided on a page sharing interface of the client of the sharer. After the first page on the client of the sharer is jumped to the second page, an upper-level page may be rolled back to by triggering the rollback control. The trigger operation on the rollback control may be, for example, a single click or double click on the rollback control, or operations such as a left click or a right click with an input device such as a mouse, which is not specifically limited herein. When the client of the sharer rolls back to the first page, the client of the sharer may display the first page, and share the first page with the client of the sharee in the follow mode at the same time.

In the case that the client of the sharer detects the trigger operation on the rollback control when sharing the second page, the upper-level page is directly rolled back to, thereby avoiding the tedious operation of the client of the sharer exiting from the currently shared second page and re-sharing the first page. Furthermore, when the client of the sharer rolls back to the first page, the first page is shared with the client of the sharee in the follow mode, thereby avoiding the tedious operation of the client of the sharee receiving the first page shared by the client of the sharer once again, and improving the information sharing efficiency and the user sharing experience.

In an embodiment, the method for switching and sharing information according to the embodiment of the present disclosure is applied to a real-time interactive application. The real-time interactive application includes at least one of an instant messaging application, a multimedia conference application, a live video application, and a group chat interactive application.

In an embodiment, the client of the sharer and the client of the sharee are both the clients with the real-time interactive application. Thus, the page information may be shared between the clients during the real-time interaction, and the shared information pages may be easily switched. The interactive form of real-time interaction is enriched, and the information sharing efficiency and the user sharing experience are improved.

Further, the first page and the second page are displayed through a browser embedded in the client of the sharer. In the embodiment, a preset browser may be embedded in the client of the sharer, through which page is displayed. The process of jumping to the second page from the first page and rolling back to the first page from the second page is carried out through the same browser, without displaying different pages by changing the browser. Thus, the page switching process is smooth to a certain extent and the user sharing experience is improved.

According to the technical solution of the embodiment of the present disclosure, the client of the sharer currently displays the first page; and sends the first page to the client of the sharee to display the first page on the client of the sharee simultaneously. The client of the sharer is jumped to the second page, in response to the click on the link to the second page in the first page on the client of the sharer; and sends the second page to the client of the share, in the case that the client of the sharee is in the follow mode, to display the second page on the client of the sharee in the follow mode by following the display of the client of the sharer.

In addition, with the common screen sharing technology, the first page of the client of the sharee can be jumped to the second page following the client of the sharer. However, network delay and video decompression distortion and other problems occur in the video streaming process, due to the high requirement on the network and video compression. As a result, the shared image becomes unsmooth and unclear, which seriously affects the effect of information sharing and user experience for attending a conference. According to the method for switching and sharing the information disclosed in the embodiments of the present disclosure, the high-fidelity and smooth information sharing is realized by sharing the page content of the information page, or together with the user operation. In addition, the second page is jumped to and shared through the trigger on the link to the second page in the currently shared first page on the client of the sharer, to facilitate the easy switching between the shared information pages, and improve information sharing efficiency and the shared experience between users.

Second Embodiment

Figure 2:
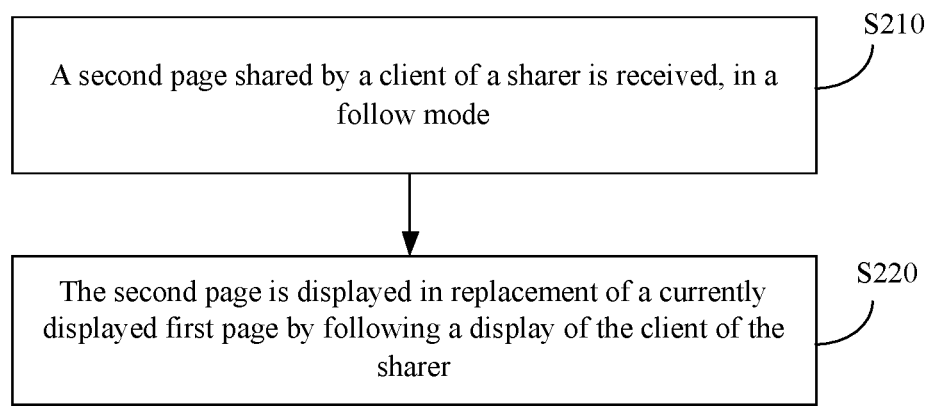
FIG. 2 is a schematic flowchart of a method for switching and sharing information according to a second embodiment of the present disclosure.

FIG. 2 is a schematic flowchart of a method for switching and sharing information according to a second embodiment of the present disclosure. The embodiment of the present disclosure is especially suitable for switching and sharing two information pages therebetween for multiple times on a client, or switching and sharing a large number of information pages. The method may be performed by means of an apparatus for switching and sharing information, which may be implemented in the form of software and/or hardware. The apparatus may be configured in an electronic device, such as a smart phone, a tablet computer, a notebook computer, or a desktop computer.

The same technical concept is shared between the method for switching and sharing the information applied to the client of the sharee according to the present embodiment of the present disclosure and the method for switching and sharing the information applied to the client of the sharer according to the embodiment described above. The technical detail that is not described in the present embodiment may be referred to the embodiment described above and the same beneficial effects can be achieved.

As shown in FIG. 2, a method for switching and sharing information according to the present embodiment is applied to a client of a sharee. The method includes the following S210 to S220.

In S210, a second page shared by a client of a sharer is received, in a follow mode.

The follow mode is a mode in which the client of the sharee follows the client of the sharer to display a page which is currently displayed on the client of the sharer.

In S220, the second page is displayed in replacement of a currently displayed first page by following a display of the client of the sharer.

The second page is shared, in the case that the client of the sharer detects a trigger operation on a link to the second page in the currently shared first page. The currently shared first page is a page currently displayed on the client of the sharer, which is sent to the client of the sharee to be displayed on the client of the sharee.

In an embodiment of the present disclosure, before receiving the second page shared by the client of the sharer, the client of the sharee is in a follow mode and display the first page shared by the client of the sharer. The client of the sharee may be in the follow mode under the following circumstances. First, in the case that the first page shared by the client of the sharer with the client of the sharee is a home page of the hierarchical page, the client of the sharee may display the home page through a click on a shared link sent by the client of the sharer. In this case, the client of the sharee is set to the follow mode by default, or is also set to the follow mode according to the trigger operation from the user. Second, in the case that the first page shared by the client of the sharer with the client of the sharee is an intermediate-level page, when the client of the sharee displays an upper-level page of the first page in the follow mode, the client of the sharee is also in the follow mode by default when displaying the first page. Third, in the case that the hierarchical page shared by the client of the sharer is freely browsed on the client of the sharee, the client of the sharee may be switched to be in the follow mode according to the trigger operation of the user. In this case, when the client of the sharer currently shares the first page, the client of the sharee may display the first page in a follow-up manner.

In the case that the client of the sharee in the follow mode displays the first page by following the display of the client of the sharer, when the second page shared by the client of the sharer is received, the client of the sharee switches displays the second page in replacement of the first page by following a display of the client of the sharee. The second page is shared by the client of the sharer in response to a detection of a trigger operation on a link to the second page in the currently shared first page. The client of the sharee jumps from the currently shared first page to the second page, when the second page is shared to the client of the sharee. Thus, a follow display is performed on the second page that is jumped to on the client of the sharer, at the client of the sharee, thereby facilitating the easy switch between the shared information pages, and improving the information sharing efficiency and the user sharing experience.

In an embodiment, after displaying the second page in replacement of a currently displayed first page by following a display of the client of the sharee, the method further includes: in the follow mode, receiving a first page shared by the client of the sharer; displaying the first page in replacement of the second page by following the display of the client of the sharer. The first page is shared by the client of the sharer in response to a detection of a trigger operation on a rollback control, when the client of the sharer shares the second page.

In an embodiment, after displaying the second page in replacement of a currently displayed first page by following a display of the client of the sharee, the client of the sharee may further receive the first page shared by the client of the sharer, to replace the second page with the first page by following the display of the client of the sharer. The first page is shared by the client of the sharer in response to a detection of a trigger operation on a rollback control, when the client of the sharer shares the second page. The currently shared second page may be rolled back to the first page, when the first page is shared with the client of the sharee. It can be considered that the client of the sharee in the follow mode only display the received page without attention to a jumping path for the client of the sharer. In this way, the page shared by the client of the sharer is displayed on the client of the sharee by following the display of the client of the sharer.

According to the technical solution of the embodiment of the present disclosure, in the case that the client of the sharee in the follow mode displays the first page, when the second page shared by the client of the sharer is received, the second page may be displayed in replacement of the currently displayed first page by following a display of the client of the sharee. When performing the follow display on the second page, the client of the sharee receives the first page shared by the client of the sharer. In this time, the follow display may be performed once more to display the first page. Therefore, in the case that two pages are switched and shared for multiple times by the client of the sharer or a large number of pages are switched and shared by the client of the sharer, the tedious operation of the client of the sharee repeatedly receiving the page shared by the client of the sharer is avoided, thereby facilitating the page switching.

Third Embodiment

Figure 3:
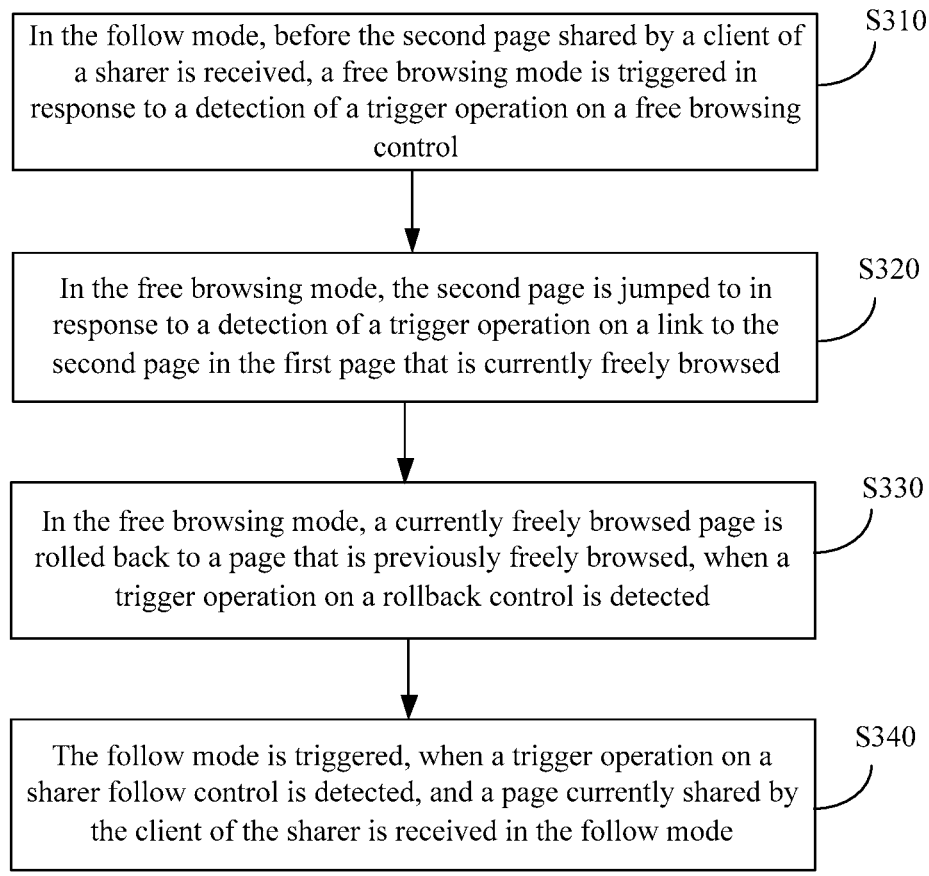
FIG. 3 is a schematic flowchart of a method for switching and sharing information according to a third embodiment of the present disclosure.

FIG. 3 is a schematic flowchart of a method for switching and sharing information according to a third embodiment of the present disclosure. The present embodiment may be combined with each optional solution in the embodiment described above. In the method for switching and sharing information according to the present embodiment, the switching between information pages on the client of the sharee in a free browsing mode is optimized, to realize the page jumping and rollback on the client of the sharee in the free browsing mode.

As shown in FIG. 3, a method for switching and sharing information according to the present embodiment includes the following S310 to S340.

In S310, in the follow mode, before the second page shared by a client of a sharer is received, a free browsing mode is triggered in response to a detection of a trigger operation on a free browsing control.

In the free browsing mode, the page can be browsed freely. The free browsing mode is a type of display mode for accessing a shared page, which is opposite to the follow mode. The free browsing mode refers to a display mode in which the client of the sharee does not display the page displayed on a currently demonstrating client. In the free browsing mode, the client of the sharee may render the displayed page according to the operation on the client of the sharee, without be affected by the page displayed on a currently demonstrating client. In an embodiment of the present disclosure, the free browsing control is provided on a page sharing interface of the client of the sharee. Before receiving the second page shared by the client of the sharer, the client of the sharee is in the follow mode and displays the first page shared by the client of the sharer. In this case, the free browsing mode may be triggered when the client of the sharee detects a trigger operation (operations such as a single-click or double-click) on the free browsing control. In the free browsing mode, the first page is allowed to be freely browsed for the user.

In S320, in the free browsing mode, the second page is jumped to in response to a detection of a trigger operation on a link to the second page in the first page that is currently freely browsed.

In the present embodiment, when the client of the sharee is in the free browsing mode, each of the hierarchical pages may be freely browsed according to the trigger operation of the user without following the display of the client of the sharer. For example, in a process of freely browsing the first page, the first page may be jumped to the second page to freely browse the second page, when the trigger operation (such as a click operation) on the link to the second page is detected. In addition, the client of the sharee may regard the second page that is jumped to, as a new first page. When a trigger operation on a link to a new second page in the new first page is detected, the new first page may be jumped to a new second page. In this way, each of the hierarchical pages shared by the client of the sharer may be freely browsed, which is beneficial for the users to browse the pages according to their own needs and improves the experience for user sharing information.

For example, it is assumed that the client of the sharee is in the follow mode, and the client of the sharee is displaying the first page, namely Page 1, shared by the client of the sharer. In this case, the client of the sharee triggers the free browsing mode when the trigger operation on the free browsing control is detection, to allow the sharee to freely browse page 1. It is assumed that the link to page 2 is embedded in page 1, and the link to page 3 is embedded in page 2. The second page (page 2) is jumped to in response to a click on the link to page 2 in the first page (page 1). In this case, page 2 may also be used as a new first page, and a new second page (page 3) is jumped to in response to a click on the link to page 3 in the new first page (page 2).

In S330, in the free browsing mode, a currently freely browsed page is rolled back to a page that is previously freely browsed, when a trigger operation on a rollback control is detected.

In an embodiment, the rollback control may be provided on a page sharing interface of the client of the sharee. When the client of the sharee in the free browsing mode detects the trigger operation (such as a click operation) on the rollback control, a currently freely browsed page is rolled back to a page that is previously freely browsed. That is to say, if the currently freely browsed page is the first page that is freely browsed, a rollback will not be performed on the client of the sharee. In this way, the jumping path on the client of the sharee is not substituted with the jumping path on the client of the sharer. Thus, a rollback abnormality on the client of the sharee can be avoided, when the jumping path on the client of the sharee in the free browsing mode is different from the jumping path on the client of the sharer.

For example, it is assumed that the client of the sharee is in the follow mode, and the client of the sharee is displaying the first page, namely page 1, shared by the client of the sharer. In this case, the client of the sharee triggers the free browsing mode when the trigger operation on the free browsing control is detected, to allow the sharee to freely browse page 1. In this case, the rollback will not be performed when the trigger operation on the rollback control is detected. On the basis of the above assumption, if the link to page 2 is embedded in page 1, page 2 is jumped to in response to a click on the link to page 2 in page 1. In this case, page 1 is rolled back to when the trigger operation on the rollback control is detected. On the basis of the above assumption, if the link to page 3 is embedded in page 2, page 3 is jumped to in response to a click on the link to page 3 in page 2. In this case, page 2 is rolled back to when the trigger operation on the rollback control is detected, and page 1 is rolled back to when the trigger operation on the rollback control is detected once again.

In S340, the follow mode is triggered, when a trigger operation on a follow control is detected, and a page currently shared by the client of the sharer is received in the follow mode.

In the present embodiment, a follow control may be provided on the page sharing interface of the client of the sharee. The client of the sharee may be switched from the free browsing mode to the follow mode when a trigger operation (such as a click operation) on the follow control is detected, to display the page currently shared by the client of the sharer by following the display of the client of the sharer. The page currently shared by the client of the sharer may be the page that is previously browsed on the client of the sharee, or may be another page in the hierarchical pages that is never browsed yet, which is not limited thereto in the present embodiment.

It should be noted that S340 may be performed, after the browsing mode is triggered in S310. There is no sequential relationship among S340, S320 and S330. Step S340 may be performed before or after S320, or before or after S330.

In the embodiment, the method for switching and sharing the information according to the embodiment of the present disclosure is applied to a real-time interactive application. The real-time interactive application includes at least one of an instant messaging application, a multimedia conference application, a live video application, and a group chat interactive application.

In the embodiment, the client of the sharer and the client of the sharee are the clients with a real-time interactive application, so that the page information may be shared during the real-time interaction between the clients, and the shared information pages are switched easily therebetween. The interactive form of real-time interaction is enriched, and information sharing efficiency and the user sharing experience are also improved.

Further, the first page and the second page are displayed through a browser embedded in the client of the sharee. In the present embodiment, a preset browser may be embedded in the client of the sharee, and the page is displayed through the preset browser. The process of the first page jumping to the second page and rolling back to the first page is carried out through the same browser, without displaying different pages on different browsers. In this way, the page switching process becomes smooth to a certain extent, thereby improving the user sharing experience.

According to the technical solution of the embodiments of the present disclosure, the page jump and rollback may be performed on the client of the sharee in the free browsing mode, and the client of the sharee may be switched from the free browsing mode to the follow mode, so as to display the page currently shared by the client of the sharer. It is helpful for users to browse the page according to their own needs, and it also ensures that the sharee may follow the page shared by the sharer, further improving the information sharing experience of the users.

Fourth Embodiment

Figure 4:
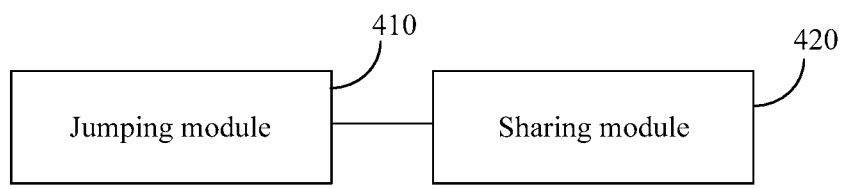
FIG. 4 is a schematic structure diagram of an apparatus for switching and sharing information according to a fourth embodiment of the present disclosure.

FIG. 4 is a schematic structural diagram of an apparatus for switching and sharing information according to a fourth embodiment of the present disclosure. The apparatus for switching and sharing information according to the present embodiment is applied to the client of the sharer, and is especially suitable for switching and sharing two information pages therebetween for multiple times on a client or switching and sharing a large number of information pages on the client.

As shown in FIG. 4, the apparatus for switching and sharing information includes a jumping module 410 and a sharing module 420.

The jumping module 410 is configured to jump to a second page in response to a detection of a trigger operation on a link to the second page in a currently shared first page, where the currently shared first page is the page currently displayed, which is sent to a client of a sharee to be displayed on the client of the sharee.

The sharing module 420 is configured to share the second page to the client of the sharee, in a case that the client of the sharee is in a follow mode, to display the second page on the client of the sharee in the follow mode by following a display of the client of the sharer, where the follow mode is a mode in which the client of the sharee follows the client of the sharer to display a page which is currently displayed on the client of the sharer.

According to the technical solution of the embodiments of the present disclosure, the client of the sharer currently displays the first page; and sends the first page to the client of the sharee to display the first page on the client of the sharee simultaneously. The client of the sharer is jumped to the second page, in response to the click on the link to the second page in the first page on the client of the sharer; and sends the second page to the client of the share, in the case that the client of the sharee is in the follow mode, to display the second page on the client of the sharee in the follow mode by following the display of the client of the sharer. The second page is jumped to and shared through the trigger on the link to the second page in the currently shared first page on the client of the sharer, which is conducive to the easy switching between the shared information pages, and improves the information sharing efficiency and the user sharing experience.

On the basis of the technical solution described above, the apparatus may also include a rollback module.

The rollback module is configured to roll back to the first page in response to a detection of a trigger operation on a rollback control, after sharing the second page to the client of the sharee in the case that the client of the sharee is in the follow mode.

The sharing module is also configured to share the first page to the client of the sharee in the follow mode, to display the first page on the client of the sharee in the follow mode by following the display of the client of the sharer.

On the basis of the technical solution described above, the apparatus for switching and sharing information may be applied to a real-time interactive application. The real-time interactive application includes at least one of an instant messaging application, a multimedia conference application, a live video application and a group chat interactive application. A preset browser is integrated into the real-time interactive application.

Based on the technical solution described above, the first page and the second page are displayed through a browser embedded in the client of the sharer.

The method for switching and sharing information applied to the client of the sharer according to any of the embodiments of the present disclosure may be executed with the apparatus for switching and sharing information according to the embodiment of the present disclosure. Specifically, the functional modules and beneficial effects corresponding to the method are executed with the apparatus for switching and sharing information according to the embodiment of the present disclosure.

It should be noted that the units and modules included in the apparatus described above are classified only according to respective functional logic, which is not limited thereto, as long as the corresponding functions can be realized. In addition, the specific names of the functional units are only used for distinguishing the functional units from each other, and are not used to limit the protection scope of the embodiments of the present disclosure.

Fifth Embodiment

Figure 5:
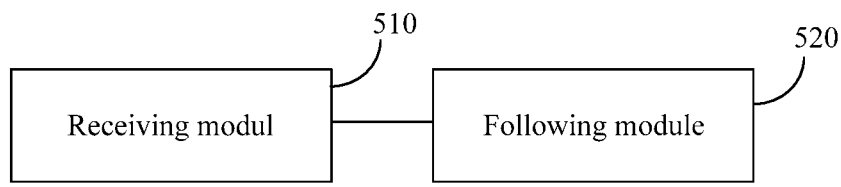
FIG. 5 is a schematic structure diagram of a apparatus for switching and sharing information according to a fifth embodiment of the present disclosure.

FIG. 5 is a schematic structural diagram of an apparatus for switching and sharing information according to a fifth embodiment of the present disclosure. The apparatus for switching and sharing the information according to the present embodiment is applied to the client of the sharee, and is especially suitable for switching and sharing two information pages therebetween for multiple times on a client or switching and sharing a large number of information pages.

As shown in FIG. 5, the apparatus for switching and sharing the information includes a receiving module 510 and a following module 520.

The receiving module 510 is configured to receive a second page shared by a client of a sharer in a follow mode, where the follow mode is a mode in which the client of the sharee follows the client of the sharer to display a page which is currently displayed on the client of the sharer.

The following module 520 is configured to display the second page in replacement of a currently displayed first page by following a display of the client of the sharer, where the second page is shared by the client of the sharer in response to a detection of a trigger operation on a link to the second page in the currently shared first page, where the currently shared first page is a page currently displayed on the client of the sharer, which is sent to a client of a sharee, to be displayed on the client of the sharee.

According to the technical solution of the embodiment of the present disclosure, in a case that the client of the sharee in the follow mode displays the first page by following the display of the client of the sharer, when receiving the second page shared by the client of the sharer, the client of the sharee switches displays the second page in replacement of the first page by following a display of the client of the sharee. In the case that the client of the sharee displays the second page by following the display of the client of the sharer, when the client of the sharee receives the first page shared by the client of the sharer, the first page may be displayed once more. Therefore, in the case that two pages are switched and shared for multiple times by the client of the sharer or a large number of pages are switched and shared by the client of the sharer, the tedious operation of the client of the sharee repeatedly receiving the page shared by the client of the sharer is avoided, thereby facilitating the page switching.

On the basis of the technical solution described above, the receiving module is also configured to receive the first page shared by the client of the sharer in the follow mode, after displaying the second page in replacement of the currently displayed first page by following the display of the client of the sharer.

The follower module is also configured to display the first page in replacement of a currently displayed second page by following the display of the client of the sharer, where the first page is shared in a case that the client of the sharer detects a trigger operation on a rollback control in a process of sharing the second page.

On the basis of the technical solution described above, the apparatus for switching and sharing information further includes a browsing mode triggering module and a browsing mode jumping module.

The browsing mode triggering module is configured to trigger a free browsing mode in response to a detection of a trigger operation on a free browsing control, where the free browsing mode is a mode in which a page is freely browsed by the client of the sharee.

The browsing mode jumping module is configured to jump to the second page in the free browsing mode, in a case that a trigger operation on a link to the second page in the first page that is currently freely browsed is detected.

On the basis of the technical solution described above, the apparatus for switching and sharing information further includes a browse mode rollback module.

The browse mode rollback module is configured to in the free browse mode, roll back to a page that is previously freely browsed from the page that is currently freely browsed in response to a detection of a trigger operation on a rollback control, after the second page is jumped to.

On the basis of the technical solution described above, the apparatus for switching and sharing information further includes a follow mode trigger module.

The follow mode trigger module is configured to trigger the follow mode in response to a detection of the trigger operation on a follow control.

The follower module is also configured to in follow mode, receive a page currently shared by the client of the sharer, after the second page is jumped to.

On the basis of the technical solution described above, the apparatus for switching and sharing information may be applied to a real-time interactive application. The real-time interactive application includes at least one of an instant messaging application, a multimedia conference application, a live video application, and a group chat interactive application. A preset browser is integrated in the real-time interactive application.

On the basis of the technical solution described above, the first page and the second page are displayed through the browser embedded in the client of the sharee.

The method for switching and sharing information applied to the client of the sharee according to any of the embodiments of the present disclosure may be executed with the apparatus for switching and sharing information according to the embodiment of the present disclosure. Specifically, the functional modules and beneficial effects corresponding to the method are executed with the apparatus for switching and sharing information according to the embodiment of the present disclosure.

It should be noted that the units and modules included in the apparatus described above are only classified according to respective functional logic, which is not limited thereto, as long as the corresponding functions can be realized. In addition, the specific names of the functional units are only used for distinguishing the functional units from each other, and are not used to limit the protection scope of the embodiments of the present disclosure.

Sixth Embodiment

Figure 6:
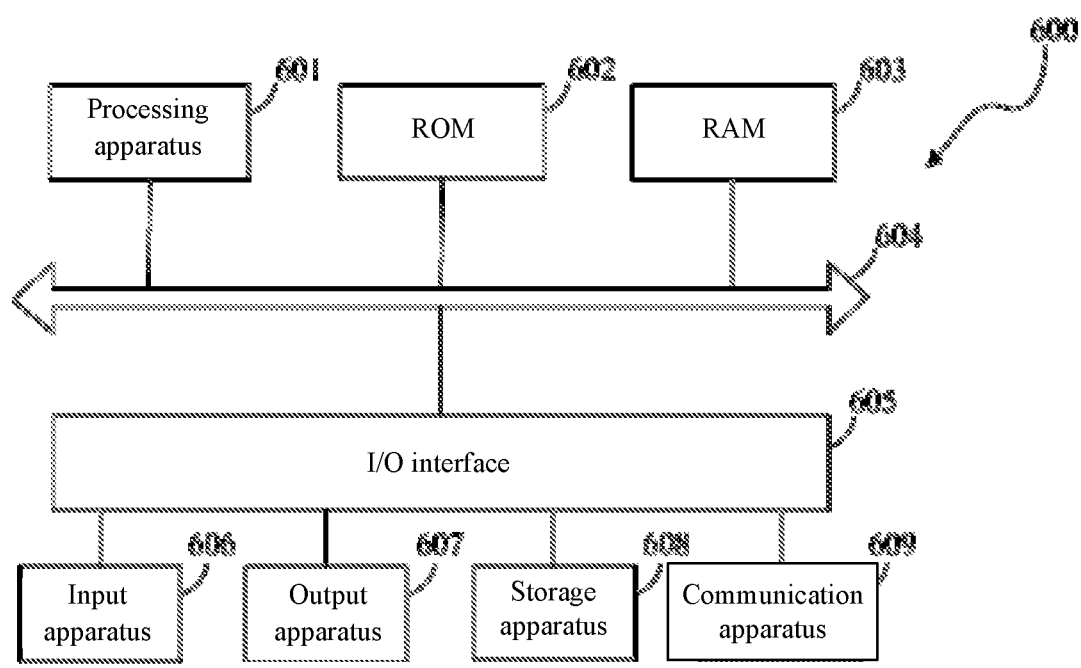
FIG. 6 is a schematic structure diagram of an electronic device according to a sixth embodiment of the present disclosure.

Reference is made to FIG. 6, which is a schematic structural diagram of an electronic device (for example, a terminal device or a server in FIG. 6) 600 suitable for implementing an embodiment of the present disclosure. The terminal device in the embodiments of the present disclosure may include, but is not limited to, a mobile terminal such as a mobile phone, a notebook computer, a digital broadcast receiver, a Personal Digital Assistant (PDA), a Portable Android Device (PAD), a Portable Media Player (PMP), an in-vehicle terminal (for example, an in-vehicle navigation terminal), and a stationary terminal such as a digital TV (television), a desktop computer. The electronic device shown in FIG. 6 is only exemplary, and should not indicate any limitation to the function and scope of application of the embodiments of the present disclosure.

As shown in FIG. 6, the electronic device 600 may include a processing apparatus (such as a central processor or a graphics processor) 601, which may execute various operations and processing through a program stored in a Read Only Memory (ROM) 602 or a program loaded from a storage apparatus 606 into a Random Access Memory (RAM) 603. The RAM 603 is further configured to store various programs and data required by the electronic device 600 to operate. The processing apparatus 601, the ROM 602 and the RAM 603 are connected to each other through a bus 604. An Input/output (I/O) interface 605 is also connected to the bus 604.

Generally, the I/O interface 605 may be connected to: an input apparatus 606, such as a touch screen, a touch panel, a keyboard, a mouse, a camera, a microphone, an accelerometer, and a gyroscope; an output apparatus 607, such as a liquid crystal display (LCD), a speaker, and a vibrator; a storage apparatus 608 such as a magnetic tape and a hard disk; and a communication apparatus 609. The communication apparatus 609 enables wireless or wired communication between the electronic device 600 and other devices for data exchanging. Although FIG. 6 shows the electronic device 600 having various components, it should be understood that the illustrated components are not necessarily required to all be implemented or embodied. Alternatively, more or fewer apparatuses may be implemented or included.

Particularly, according to an embodiment of the present disclosure, the process described above in conjunction with flow charts may be implemented as a computer software program. For example, a computer program product is further provided as an embodiment of the present disclosure, including a computer program carried on a non-transient computer readable medium. The computer program includes program code for performing the method shown in the flowchart. In the embodiment, the computer program may be downloaded and installed from the network via the communication apparatus 609, or installed from the storage apparatus 606, or installed from the ROM 602. When the computer program is executed by the processing apparatus 601, the functions defined in the method described above according to the embodiment of the present disclosure are performed.

The electronic device according to the embodiment of the present disclosure and the method for switching and sharing information according to the embodiment described above belong to the same concept of the present disclosure. For the technical details that are not described in detail in the present embodiment, reference is made to the embodiments described above. The present embodiment has the same beneficial effect as the embodiments described above.

Seventh Embodiment

Embodiments of the present disclosure provide a computer storage medium storing a computer program thereon. The program, when executed by a processor, performs the method for switching and sharing the information according to the embodiments described above.

It should be noted that, the computer readable medium mentioned herein above may be a computer readable signal medium or a computer readable storage medium or any combination thereof. The computer readable storage medium may be, but is not limited to, a system, an apparatus, or a device in an electronic, magnetic, optical, electromagnetic, infrared, or semi-conductive form, or any combination thereof. A more specific example of the computer-readable storage medium may include, but is not limited to: an electrical connection having one or more wires, a portable computer magnetic disk, a hard disk, a random access memory (RAM), a read-only memory (ROM), an erasable programmable read-only memory (EPROM), a flash memory, an optical fiber, a portable compact disk read-only memory (CD-ROM), an optical storage device, a magnetic storage device, or any appropriate combination thereof. In the embodiment of the present disclosure, the computer readable storage medium may be any tangible medium containing or storing a program, and the program may be used by or in combination with an instruction execution system, apparatus, or device. In the embodiment of the present disclosure, the computer readable signal medium may be a data signal transmitted in a baseband or transmitted as a part of a carrier wave and carrying computer readable program codes. The transmitted data signal may be in various forms, including but not limited to an electromagnetic signal, an optical signal or any proper combination thereof. The computer readable signal medium may be any computer readable medium other than the computer readable storage medium, and can send, propagate or transmit programs to be used by or in combination with an instruction execution system, apparatus or device. The program codes stored in the computer readable medium may be transmitted via any proper medium including but not limited to: a wire, an optical cable, radio frequency (RF) and the like, or any proper combination thereof.

In some embodiments, a client and a server may communicate with each other using any currently known network protocol, such as hypertext transfer protocol (HTTP) or future developed network protocol, and may interconnect with each other through digital data communication in any form or medium (for example, a communication network). Examples of a communication network include a local area network (LAN), a wide area network (WAN), the internet (for example, the Internet), and an end-to-end network (for example, ad hoc end-to-end network) or any currently known or future developed network.

The computer readable medium may be incorporated in the electronic device, or may exist alone without being assembled into the electronic device.

The computer readable medium carries one or more programs. The one or more programs, when being executed by the electronic device, cause the electronic device to: jump to a second page, in response to a detection of a trigger operation on a link to the second page in a currently shared first page, where the currently shared first page is a page currently displayed, which is sent to a client of a sharee to be displayed on the client of the sharee; and share the second page to the client of the sharee, in a case that the client of the sharee is in a follow mode, to display the second page on the client of the sharee in the follow mode by following a display of the client of the sharer, where the follow mode is a mode in which the client of the sharee follows the client of the sharer to display a page which is currently displayed on the client of the sharer.

Alternatively, The one or more programs, when being executed by the electronic device, cause the electronic device to: receive a second page shared by a client of a sharer, in a follow mode, where the follow mode is a mode in which a client of a sharee follows the client of the sharer to display a page which is currently displayed on the client of the sharer; and display the second page in replacement of a currently displayed first page by following a display of the client of the sharer, where the second page is shared by the client of the sharer in response to a detection of a trigger operation on a link to the second page in the currently shared first page, and where the currently shared first page is a page currently displayed on the client of the sharer, which is sent to the client of the sharee to be displayed on the client of the sharee.

The computer program code for performing the operations disclosed in the embodiments of the present disclosure may be written in one or more programming languages or combinations thereof. The programming languages include but not limited to an object-oriented programming language, such as Java, Smalltalk, and C++, and a conventional procedural programming language, such as C language or a similar programming language. The program code may be executed entirely on a user computer, partially on the user computer, as a standalone software package, partially on the user computer and partially on a remote computer, or entirely on the remote computer or a server. In a case involving a remote computer, the remote computer may be connected to a user computer through any kind of network including local area network (LAN) or wide area network (WAN), or to an external computer through Internet connection by an Internet service provider, for example.

Flow charts and block diagrams in the drawings illustrate the architecture, functions and operations that can be implemented by the system, method and computer program product according to the embodiments of the present disclosure. Each block in a flowchart or a block diagram may represent a module, a program segment, or a part of code, and the module, program segment, or part of code contains one or more executable instructions for implementing the specified logical function. It should be noted that, in some alternative implementations, the functions marked in blocks may be performed in an order different from the order shown in the drawings. For example, two blocks shown in succession may actually be executed in parallel, or sometimes may be executed in a reverse order, which depends on the functions involved. It should also be noted that each of the blocks in the block diagram and/or flowchart and a combination of the blocks in the block diagram and/or flowchart may be implemented by a dedicated hardware-based system that performs specified functions or actions, or may be implemented by a combination of dedicated hardware and computer instructions.

The units mentioned in the embodiments of the present disclosure may be implemented by means of software, or otherwise by means of hardware. In some circumstances, name of a module does not constitute a limitation on the module itself. For example, a sharing module may also be described as a "page sharing module".

The functions described herein above may be performed, at least in part, by one or more hardware logic components. For example, without limitation, exemplary types of hardware logic components that may be used include: Field Programmable Gate Array (FPGA), Application Specific Integrated Circuit (ASIC), Application Specific Standard Product (ASSP), System on Chip (SOC), Complex Programmable Logic Device (CPLD) and so on.

In the context of the present disclosure, a machine-readable medium may be a tangible medium that may contain or store a program for use by or in connection with an instruction execution system, apparatus, or device. The machine-readable medium may be a machine-readable signal medium or a machine-readable storage medium. Machine-readable medium may include, but is not limited to, a system, an apparatus, or a device in electronic, magnetic, optical, electromagnetic, infrared, or semiconductor form, or any proper combination thereof. More specific examples of machine-readable storage medium include an electrical connection based on one or more wires, a portable computer disk, a hard disk, a random access memory (RAM), a read only memory (ROM), an erasable programmable read only memory (EPROM or flash memory), an optical fiber, a portable compact disc read-only memory (CD-ROM), an optical storage device, a magnetic storage device, or any proper combination thereof.

According to one or more embodiments of the present disclosure, a method for switching and sharing information is provided in Example 1. The method is applied to a client of a sharer. The method includes:
  jumping to a second page in response to a detection of a trigger operation on a link to the second page in a currently shared first page, where the currently shared first page is a page currently displayed, which is sent to a client of a sharee to be displayed on the client of the sharee; and
  sharing the second page with the client of the sharee, in a case that the client of the sharee is in a follow mode, to display the second page on the client of the sharee in the follow mode by following a display of the client of the sharer, where the follow mode is a mode in which the client of the sharee follows the client of the sharer to display a page which is currently displayed on the client of the sharer.

According to one or more embodiments of the present disclosure, the method for switching and sharing the information is provided in Example 2. After sharing the second page to the client of the sharee in a follow mode, the method further includes:
  rolling back to the first page in response to a detection of a trigger operation on a rollback control; and
  sharing the first page to the client of the sharee, in the case that the client of the sharee is in the follow mode, to display the first page on the client of the sharee in the follow mode by following the display of the client of the sharer.

According to one or more embodiments of the present disclosure, the method for switching and sharing the information is provided in Example 3. The method is applied to a real-time interactive application, and the real-time interactive application includes at least one of an instant messaging application, a multimedia conference application, a live video application and a group chat interactive application According to one or more embodiments of the present disclosure, the method for switching and sharing the information is provided in Example 4. In the method, the first page and the second page are displayed through a browser embedded in the client of the sharer.

According to one or more embodiments of the present disclosure, a method for switching and sharing information is provided in Example 5. The method is applied to a client of a sharee. The method includes:
  receiving a second page shared by a client of a sharer, in a follow mode, where the follow mode is a mode in which a client of a sharee follows the client of the sharer to display a page which is currently displayed on the client of the sharer; and
  displaying the second page in replacement of a currently displayed first page by following a display of the client of the sharer, where the second page is shared in a case that the client of the sharer detects a trigger operation on a link to the second page in the currently shared first page, and where the currently shared first page is a page currently displayed on the client of the sharer, which is sent to the client of the sharee to be displayed on the client of the sharee.

According to one or more embodiments of the present disclosure, the method for switching and sharing the information is provided in Example 6. Optionally, after displaying the second page in replacement of a currently displayed first page by following a display of the client of the sharer, the method further includes:
  in the follow mode, receiving the first page shared by the client of the sharer; and
  displaying the first page in replacement of the currently displayed second page by following the display of the client of the sharer, where the first page is shared in a case that the client of the sharer detects a trigger operation on a rollback control when sharing the second page.

According to one or more embodiments of the present disclosure, the method for switching and sharing the information is provided in Example 7. After displaying the second page in replacement of a currently displayed first page by following a display of the client of the sharer, the method further includes:
  in the follow mode, receiving the first page shared by the client of the sharer; and
  displaying the first page in replacement of the currently displayed second page by following the display of the client of the sharer, where the first page is shared in a case that the client of the sharer detects a trigger operation on a rollback control when sharing the second page.

According to one or more embodiments of the present disclosure, the method for switching and sharing the information is provided in Example 8. After jumping to the second page, the method further includes:
  in the free browsing mode, rolling back to a page that is previously freely browsed from a page that is currently freely browsed, in response to a detection of a trigger operation on a rollback control.

According to one or more embodiments of the present disclosure, the method for switching and sharing the information is provided in Example 9. After jumping to the second page, the method further includes:
  triggering a follow mode in response to a detection of a trigger operation on a follow control; and
  receiving a page currently shared by the client of the sharer, in the follow mode.

According to one or more embodiments of the present disclosure, the method for switching and sharing the information is provided in Example 10. The method is applied to a real-time interactive application, and the real-time interactive application includes at least one of an instant messaging application, a multimedia conference application, a live video application and a group chat interactive application.

According to one or more embodiments of the present disclosure, the method for switching and sharing the information is provided in Example 11. In the method, the first page and the second page are displayed through a browser embedded in the client of the sharee.

The above descriptions are only preferred embodiments of the present disclosure and explanations of the technical principles used in the present disclosure. Those skilled in the art should understand that the scope of the present disclosure is not limited to the technical solution formed by combination of the technical features described above, but also covers other technical solutions formed by any combination of the above technical features or the equivalent features of the technical features without departing from the concept of the present disclosure. For example, a technical solution formed by interchanging the above features and technical features having similar functions as disclosed, but not limited to, in the present disclosure with each other is also covered with the scope of the present disclosure.

In addition, although the above operations are described in a specific order, it should not be understood that these operations are required to be performed in the specific order or performed in a sequential order. In some conditions, multitasking and parallel processing may be advantageous. Although multiple implementation details are included in the above descriptions, the details should not be interpreted as limitations to the scope of the present disclosure. Some features described in an embodiment may be implemented in combination in another embodiment. In addition, the features described in an embodiment may be implemented individually or in any suitable sub-combination form in multiple embodiments.

Although the subject of the present disclosure has been described according to the structural features and/or logical actions of the method, it should be understood that the subject defined in the claims is not necessarily limited to the features or actions described above. The specific features and actions described above are only examples of the implementation of the claims.

The invention claimed is:

1. A method for switching and sharing information, wherein the method is applied to a client of a sharee, and the method comprises:
   receiving a first page shared by a client of a sharer, in a free browsing mode, wherein the shared first page comprises a link to a second page, and the free browsing mode is a mode in which a page is freely browsed by the client of the sharee and is not affected by the client of the sharer; and
   jumping to the second page in response to a detection of a trigger operation on the link in the shared first page, without being affected by the client of the sharer.

2. The method according to claim 1, wherein before receiving the first page in the free browsing mode, the method comprises:
   receiving a trigger operation on a free browsing control; and
   switching the client of the sharer from a follow mode to the free browsing mode, wherein the follow mode is a mode in which the client of the sharee follows the client of the sharer to display a page which is currently displayed on the client of the sharer.

3. The method according to claim 1, wherein after jumping to the second page, the method comprises:
   in the free browsing mode, rolling back to a page that is previously freely browsed from a page that is currently freely browsed, in response to a detection of a trigger operation on a rollback control.

4. The method according to claim 2, wherein after switching the client of the sharer from the follow mode to the free browsing mode, the method comprises:
   triggering the follow mode, in response to a detection of a trigger operation on a follow control; and
   displaying a page currently shared by the client of the sharer, in the follow mode.

5. The method according to claim 1, wherein the method is applied to a real-time interactive application, and the real-time interactive application comprises at least one of an instant messaging application, a multimedia conference application, a live video application and a group chat interactive application.

6. The method according to claim 5, wherein the first page and the second page are displayed through a browser embedded in the client of the sharee.

7. An apparatus for switching and sharing information, wherein the apparatus is applied to a client of a sharee, and comprises:
   one or more processors;
   a storage apparatus, for storing one or more programs,
   wherein the one or more programs, when executed by the one or more processors, cause the one or more processors to:
   receive a first page shared by a client of a sharer, in a free browsing mode, wherein the shared first page comprises a link to a second page, and the free browsing mode is a mode in which a page is freely browsed by the client of the sharee and is not affected by the client of the sharer; and
   jump to the second page in response to a detection of a trigger operation on the link in the shared first page, without being affected by the client of the sharer.

8. The apparatus according to claim 7, wherein before the first page is received in the free browsing mode, the one or more programs, when executed by the one or more processors, cause the one or more processors to:
   receive a trigger operation on a free browsing control; and
   switch the client of the sharer from a follow mode to the free browsing mode, wherein the follow mode is a mode in which the client of the sharee follows the client of the sharer to display a page which is currently displayed on the client of the sharer.

9. The apparatus according to claim 7, wherein the one or more programs, when executed by the one or more processors, cause the one or more processors to:
   in the free browsing mode, roll back to a page that is previously freely browsed from a page that is currently freely browsed, in response to a detection of a trigger operation on a rollback control, after the second page is jumped to.

10. The apparatus according to claim 8, wherein after the client of the sharer is switched from the follow mode to the free browsing mode, the one or more programs, when executed by the one or more processors, cause the one or more processors to:
    trigger the follow mode, in response to a detection of a trigger operation on a follow control; and display a page currently shared by the client of the sharer, in the follow mode.

11. The apparatus according to claim 7, wherein a real-time interactive application is installed on the apparatus, and the real-time interactive application comprises at least one of an instant messaging application, a multimedia conference application, a live video application and a group chat interactive application.

12. The apparatus according to claim 11, wherein the first page and the second page are displayed through a browser embedded in the client of the sharee.

13. A non-transitory computer storage medium, wherein the computer storage medium comprises program instructions; and the program instructions, when running on an electronic device, cause the electronic device to:
  receive a first page shared by a client of a sharer, in a free browsing mode, wherein the shared first page comprises a link to a second page, and the free browsing mode is a mode in which a page is freely browsed by the client of the sharee and is not affected by the client of the sharer; and
  jump to the second page in response to a detection of a trigger operation on the link in the shared first page, without being affected by the client of the sharer.

14. The non-transitory computer storage medium according to claim 13, wherein before the first page is received in the free browsing mode, the program instructions, when running on an electronic device, cause the electronic device to:
  receive a trigger operation on a free browsing control; and
  switch the client of the sharer from a follow mode to the free browsing mode, wherein the follow mode is a mode in which the client of the sharee follows the client of the sharer to display a page which is currently displayed on the client of the sharer.

15. The non-transitory computer storage medium according to claim 13, wherein the program instructions, when running on an electronic device, cause the electronic device to:
  in the free browsing mode, roll back to a page that is previously freely browsed from a page that is currently freely browsed, in response to a detection of a trigger operation on a rollback control, after the second page is jumped to.

16. The non-transitory computer storage medium according to claim 14, wherein after the client of the sharer is switched from the follow mode to the free browsing mode, the program instructions, when running on an electronic device, cause the electronic device to:
  trigger the follow mode, in response to a detection of a trigger operation on a follow control; and
  display a page currently shared by the client of the sharer, in the follow mode.

17. The non-transitory computer storage medium according to claim 13, wherein a real-time interactive application is installed on the electronic device, and the real-time interactive application comprises at least one of an instant messaging application, a multimedia conference application, a live video application and a group chat interactive application.

18. The non-transitory computer storage medium according to claim 17, wherein the first page and the second page are displayed through a browser embedded in the client of the sharee.

* * * * *